United States Patent Office 3,639,343
Patented Feb. 1, 1972

3,639,343
POLYIMIDES AND COPOLYIMIDES FROM AROMATIC DIAMINES AND ALICYCLIC DIANHYDRIDES
George Chung-Chi Su, Devon, Wilmington, Del., assignor to E. I. du Pont de Nemours and Company, Wilmington, Del.
No Drawing. Filed Feb. 11, 1969, Ser. No. 798,436
Int. Cl. C08g 20/32
U.S. Cl. 260—47      7 Claims

ABSTRACT OF THE DISCLOSURE

Polyimides and copolyimides in which the radicals to which the four carbonyl groups are attached are alicyclic and contain either 6 or 10 carbon atoms and in which the radicals that are singly bonded to two separate nitrogen atoms are aromatic.

---

This invention relates to melt processable polyimides and copolyimides. More particularly, this invention relates to polyimides and copolyimides having the recurring unit:

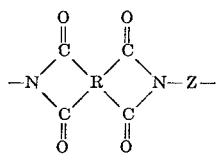

wherein R is alicyclic and contains 6 or 10 carbon atoms and Z is aromatic.

Desirable properties in polyimides and copolyimides are stability and stiffness at high temperatures plus ease of melt processing. Prior polyimides and copolyimides in which the R radical of the recurring unit is aromatic have the properties of stability and stiffness at high temperatures, but are either nonmelting or form stiff, nonfluid melts which are extremely difficult if not impossible to melt process.

Therefore, the principal object of this invention is to provide polyimide or copolyimide compositions which have stability and stiffness at high temperatures yet are readily melt processable.

The polyimides and copolyimides of this invention in which the R radicals of the recurring units are entirely alicyclic fulfill the above object in that these polyimides and copolyimides have the properties of stability and stiffness at high temperatures and are melt processable. Further, they have excellent properties such as high glass transition temperature, high flexural modulus, good hydrolytic stability and good solvent resistance at room temperature.

The invention, then, is a melt processable polyimide which is capable of being formed into a film, said polyimide consisting essentially of the recurring unit:

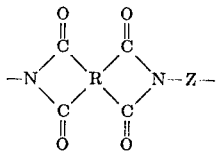

wherein R may differ between units and is a tetravalent radical selected from the class consisting of a saturated monocyclic structure containing 6 carbon atoms and a saturated bicyclic structure containing 10 carbon atoms, the four carbonyl groups being attached directly to separate carbon atoms in the R radical and the carbonyl groups of each pair being attached to adjacent carbon atoms in a ring of the R radical; and where Z may differ between units and is a divalent radical having a structure selected from the class consisting of M, Ar', Ar'—Ar", Ar'—X—Ar", and Ar'—X—Ar"—X—Ar'''; wherein M is a 10 carbon atom bicyclic structure containing 2 fused 6 carbon atom rings and is characterized by benzenoid unsaturation, wherein Ar', Ar", and Ar''' are monocyclic structures containing 6 carbon atoms and are characterized by benzenoid unsaturation and wherein X may differ within the Z radical and is selected from the class consisting of —O—, —S—, —SO$_2$—, —CH$_2$—, —CH(CH$_3$)—, —C(CH$_3$)$_2$—, —C(CF$_3$)$_2$—, —CO— and —CONH—.

Specific copolyimides are those containing the above recurring units in which the R radical is the same throughout and is selected from said R radical class and in which the Z radical differs between units in that it may be either of two Z radicals, the two Z radicals being selected from said Z radical class. Further specific copolyimides are those containing the previously mentioned recurring unit in which the R radical differs between units in that it may be either of the two R radicals selected from said R radical class and in which the same Z radical occurs throughout, said Z radical being selected from the said Z radical class. For the copolyimide or polyimide to be melt processable, the Z radical must contain an X if the same Z radical is to be used throughout. If more than one Z radical is used, one must contain an X.

Particular Z radicals are Ar'—CH$_2$—Ar",

Ar'—O—Ar"—O—Ar''' and Ar'—O—Ar". Particular copolyimides are those in which the R is the saturated monocyclic structure containing 6 carbon atoms and the Z's differ between units and are (1) Ar' and Ar'—CH$_2$—Ar" or (2)

Ar'—O—Ar"—O—Ar''' and M. Another particular copolyimide is one in which the R differs between units and is the saturated monocyclic structure containing 6 carbon atoms and the saturated bicyclic structure containing 10 carbon atoms and the Z is Ar'—CH$_2$—Ar".

The melt processable polyimides of this invention are obtained from at least one alicyclic tetracarboxylic acid dianhydride having the formula:

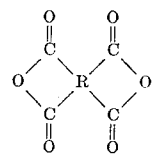

wherein R is a tetravalent radical selected from the class consisting of a saturated monocyclic structure containing 6 carbon atoms and a saturated bicyclic structure containing 10 carbon atoms, the four carbonyl groups being attached directly to separate carbon atoms in the R radical and the carbonyl groups of each pair being attached to adjacent carbon atoms in a ring of the R radical; and at least one aromatic diamine having the formula H$_2$N—Z—NH$_2$ wherein Z is a divalent radical selected from the group consisting of M, Ar', Ar'—Ar", Ar'—X—Ar", and Ar—X—Ar"—X—Ar'''; wherein M is a 10 carbon atom bicyclic structure containing 2 fused 6 carbon atom rings and is characterized by benzenoid unsaturation, wherein Ar', Ar", and Ar''' are monocyclic structures containing 6 carbon atoms and are characterized by benzenoid unsaturation and wherein X may differ within the Z radical and is selected from the class consisting of —O—, —S—, —SO$_2$—, —CH$_2$, —CH(CH$_3$)—, —C(CH$_3$)$_2$—, —C(CF$_3$)$_2$—, —CO— and —CONH—.

Specific copolyimides are those from one alicyclic tetracarboxylic acid dianhydride as presented above and two different aromatic diamines as presented above. Further specific copolyimides are those from two different alicyclic tetracarboxylic acid dianhydrides as presented above and from one aromatic diamine as presented above. For the polyimide or copolyimide to be melt processable, the aromatic diamine if used singularly must contain an X. If more than one aromatic diamine is used, one must contain an X.

The tetracarboxylic acid dianhydrides include cyclohexane-1,2,4,5-tetracarboxylic acid dianhydride (prepared by known methods) and bicyclo [4.4.0] decane-3,4,8,9-tetracarboxylic acid dianhydride. Particular aromatic diamines include 4,4-diaminodiphenyl methane, 1,3-bis-(4-aminophenoxy) benzene, and 4,4'-diaminodiphenyl ether.

The preparation of bicyclo [4.4.0] decane-3,4,8,9-tetracarboxylic acid dianhydride was as follows:

A solution of 36.8 g. (0.1 mole) tetramethyl-1,2,3,4,5,6,7,8 - octahydronaphthalene-2,3,6,7-tetracarboxylate (prepared by known methods) in 220 ml. glacial acetic acid and 1 ml. concentrated sulfuric acid with 0.5 g. Adam's ($PtO_2$) catalyst (preparation found in Organic Syntheses, collective volume I, 2nd ed., 7th printing, 1956, pp. 463–470) was hydrogenated at approximately 100° C. and 60 p.s.i. in a heated Paar shaker hydrogenating apparatus until hydrogen uptake ceased (approximately 11 p.s.i. decrease over approximately 40 min.).

The catalyst was removed by filtration through Celite® filteraid and the solvent was removed by distillation to give 37 g. of a colorless oil. Trituration with petroleum ether (M.P. 30–60° C.) resulted in crystallization of the oil (M.P. 100–110° C.).

A solution of 148 g. (0.4 mole) of the impure crystallized oil (tetramethyl bicyclo [4.4.0] decane-3,4,8,9-tetracarboxylate) (M.P. 100–110° C.) in 600 ml. 48% hydro-bromic acid was refluxed with efficient stirring for 45 min. After 30 min. bicyclo [4.4.0] decane-3,4,8,9-tetracarboxylic acid precipitated as a white powder. The product was filtered and washed 8–10 times with diethyl ether to dry it and further dried overnight under vacuum at 60° C. It was used with no further purification.

A mixture of 113 g. (approximately 0.3 mole) of impure bicyclo [4.4.0] decane-3,4,8,9-tetracarboxylic acid and 650 ml. acetic anhydride was refluxed with stirring for one hour. The solution was then cooled to 0° C. and the resulting white crystals were separated by filtration, washed with ether and dried at 100° C. for one hour (M.P. 230–235° C.).

For polymerization, this material was recrystallized at least two times from acetonitrile/acetic anhydride (95/5) or from acetic acid/acetic anhydride (1/1). Thus bicyclo [4.4.0] decane-3,4,8,9-tetracarboxylic acid dianhydride (M.P. 238–240° C.) was formed.

The following examples illustrate but do not limit the invention. All inherent viscosity measurements were made with the polyimide or copolyimide at a 0.5% solution in concentrated sulfuric acid at 25° C. Thermal gravimetric analysis results shown are the temperatures at which the polyimide or copolyimide decreased in weight by 1% after being heated at 10° C./min. in nitrogen.

EXAMPLE I

Into a thoroughly dried 3 neck flask equipped with a mechanical stirrer and in a dry nitrogen atmosphere, was added 3.965 g. (0.020 mole) of 4,4'-diamino-diphenyl methane dissolved in 40 cc. of anhydrous dimethylacetamide. The flask was cooled in an ice bath, and with constant stirring, 4.483 g. (0.020 mole) of solid cyclohexane-1,2,4,5-tetracarboxylic acid dianhydride was added to the diamine solution. The rate of addition was slow in order to keep the solution temperature below 20° C. Additional solvent was added to give a final volume of 100 cc.

This solution was stirred for several minutes while the flask in which it was contained was held in the ice bath, then it was stirred for one hour at room temperature, and finally the solution was stirred while being heated at 50–60° C. for one hour.

The solution of polyamide-acid was poured into an aluminum tray lined loosely with a skived, 3 mil. film of TFE fluorocarbon resin and was evaporated under nitrogen. A solid film of polymer formed at the bottom of the tray. Additional drying was carried out at 85° C. for 16 hours in a vacuum oven equipped with a nitrogen stream.

The dry powdered polyamide-acid was converted into polyimide by heating it under vacuum at 100° C. for one hour, followed by heating for ½ hour intervals at 125°, 150°, 175°, 200°, 250° and 275°. The resulting polyimide had an inherent viscosity of 0.66. The polyimide was compression molded at 380° C. into a transparent yellow, tough, creasable film with a density of 1.31. It was extruded through a melt indexer at 435° C. with an apparent melt viscosity of approximately $10^4$–$10^5$ poise at a shear stress of 100,000 dyes/cm.², calculated according to ASTM D 1703 and ASTM D 1238.

Analysis of the polyimide by differential thermal analysis showed a glass transition temperature of 304° C. The thermal gravimetric analysis result was 480° C. Flexural modulus measurements according to ASTM D 790 on the polyimide produced values of 540,000 p.s.i. at 25° C. and 310,000 p.s.i. at 275° C.

EXAMPLE 2

Following the procedure described in Example 1, a polyimide was prepared from 1.983 g. (0.010 mole) 4,4'-diamino-diphenyl methane and 2.783 g. (0.010 mole) bicyclo [4.4.0] decane-3,4,8,9-tetracarboxylic acid dianhydride. The polyimide powder was compression molded at 380° C. into a transparent gold colored, tough creasable film. The polymer was melt extruded through the melt indexer at 435° C. with an apparent melt viscosity of approximately $10^4$–$10^5$ poise at a shear stress of $10^5$ dynes/cm.², calculated according to ASTM D 1730 and ASTM D 1238. The polyimide had the following properties:

Inherent viscosity—0.52
Glass transition temperature—316° C. (differential thermal analysis)
Thermal gravimetric analysis—490° C.

EXAMPLE 3

Following the procedure described in Example 1, a copolyimide was prepared from a 1 to 1 mixture of 1.083 g. (0.0100 mole) m-phenylenediamine and 1.983 g. (0.0100 mole) 4,4'-diamino-diphenyl methane and from 4.483 g. (0.0200 mole) cyclohexane-1,2,4,5-tetracarboxylic acid dianhydride. The copolyimide powder was compression molded at 380° C. into a transparent, light brown film. The copolyimide had the following properties:

Inherent viscosity—0.54
Glass transition temperature—332° C. (differential thermal analysis)

EXAMPLE 4

Following the procedure described in Example 1, a copolyimide was prepared from 4.658 g. (0.0235 mole) 4,4'-diaminodiphenyl methane and from a 5.7 to 1 mole mixture of 4.483 g. (0.0200 mole) cyclohexane-1,2,4,5-tetracarboxylic acid dianhydride and 0.972 g. (0.0035 mole) bicyclo, [4.4.0] decane-3,4,8,9-tetracarboxylic acid dianhydride. The copolyimide was compression molded at 380° C. into transparent, light yellow, tough film. The copolyimide had the following properties:

Inherent viscosity—0.80
Thermal gravimetric analysis—475° C.

EXAMPLE 5

Following the procedure of Example 1, a polyimide was prepared from 2.503 g. (0.0125 mole) 4,4'-diaminodiphenyl ether and 3.478 g. (0.0125 mole) bicyclo [4.4.0] decane-3,4,8,9-tetracarboxylic acid dianhydride. The polyimide was a yellow powder that was compression molded at 380° C. into a tough, creasable, transparent amber film. The polyimide had the following properties:

Inherent viscosity—0.64
Glass transition temperature—307° C. (differential thermal analysis)
Thermal gravimetric analysis—450° C.

EXAMPLE 6

Following the procedure of Example 1, a polyimide was prepared from 1.352 g. (0.0125 mole) m-phenylenediamine and 3.478 g. (0.0125 mole) bicyclo [4.4.0] decane-3,4,8,9-tetracarboxylic acid dianhydride. The polyimide powder was compression molded into a stiff, brittle, amber film at 390° C. The polyimide had the following properties:

Inherent viscosity—0.72
Thermal gravimetric analysis—450° C.

EXAMPLE 7

Following the procedure of Example 1, a copolyimide was prepared from a 5.7 to 1 mole mixture of 8.2159 g. (0.0281 mole) 1,3 - bis(4 - aminophenoxy)benzene and 0.4939 g. (0.0031 mole) 1,5-naphthalene diamine and from 7.0002 g. (0.0312 mole) cyclohexane-1,2,4,5-tetracarboxylic acid dianhydride. The copolyimide powder was compression molded at 380° C. into a transparent, light brown film. The copolyimide had an apparent melt viscosity at 435° C. of much less than $10^4$ poise. The copolyimide had the following properties:

Inherent viscosity—0.49
Glass transition temperature—265° C. (differential thermal analysis)
Thermal gravimetric analysis—450° C.

I claim:
1. A melt processable polyimide which is capable of being formed into a film, said polyimide consisting essentially of the recurring unit

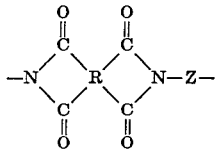

wherein R may differ between units and is selected from the group consisting of a tetravalent cyclohexane radical and a tetravalent bicyclo (4.4.0) decane radical, the four carbonyl groups being attached directly to separate carbon atoms in the R radical and the carbonyl groups of each pair being attached to adjacent carbon atoms in the ring of the R radical; and wherein Z may differ between units and is a divalent radical having a structure selected from the class consisting of M, Ar', Ar'—Ar'', Ar'—X—Ar'', and Ar'—X—Ar''—X—Ar''', wherein M is a 10 carbon atom bicyclic structure containing 2 fused 6 carbon atom rings and is characterized by benzenoid unsaturation, wherein Ar', Ar'', and Ar''' are monocyclic structures containing 6 carbon atoms and are characterized by benzenoid unsaturation and wherein X may differ within the Z radical and is selected from the class consisting of —O—, —S—, —SO$_2$—, —CH$_2$—, —CH(CH$_3$)—, —C(CH$_3$)$_2$—, —C(CF$_3$)$_2$—, —CO—, and —CONH—.

2. A copolyimide as in claim 1 containing recurring units with the same R radical but with two different Z radicals.

3. A copolyimide as in claim 1 containing recurring units with two different R radicals but with the same Z radical.

4. A polyimide as in claim 1 wherein Z is selected from the group consisting of Ar'—CH$_2$—Ar'', Ar'—O—Ar''—O—Ar''' and Ar'—O—Ar''.

5. A copolyimide as in claim 2 in which the R is a tetravalent cyclohexane radical and the Z differs between units and is Ar' and Ar'—CH$_2$—Ar''.

6. A copolyimide as in claim 3 in which the R differs between units and is a tetravalent cyclohexane radical and a tetravalent bicyclo (4.4.0) decane radical and the Z is Ar'—CH$_2$—Ar''.

7. A copolyimide as in claim 2 in which the R is a tetravalent cyclohexane radical and the Z differs between units and is Ar'—O—Ar''—O—Ar''' and M.

References Cited

UNITED STATES PATENTS 3,179,614   4/1965   Edwards _____ 260—30.2
3,423,431   1/1969   Starr et al. _____ 260—346.3

WILLIAM H. SHORT, Primary Examiner
L. L. LEE, Assistant Examiner

U.S. Cl. X.R.
260—65, 78, 326